US010445957B2

(12) United States Patent
Savolainen

(10) Patent No.: US 10,445,957 B2
(45) Date of Patent: Oct. 15, 2019

(54) METHOD AND APPARATUS FOR PROXYING ACCESS COMMANDS TO SMART OBJECT(S) IN RESPONSE TO AN EMERGENCY CONDITION

(71) Applicant: Nokia Technologies Oy, Espoo (FI)

(72) Inventor: Teemu Ilmari Savolainen, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/169,030

(22) Filed: May 31, 2016

(65) Prior Publication Data

US 2017/0345238 A1 Nov. 30, 2017

(51) Int. Cl.
| | | |
|---|---|---|
| G07C 9/00 | (2006.01) |
| H04W 4/90 | (2018.01) |
| H04L 29/08 | (2006.01) |
| H04W 4/70 | (2018.01) |
| H04W 12/08 | (2009.01) |

(52) U.S. Cl.
CPC ........ *G07C 9/00126* (2013.01); *H04L 67/125* (2013.01); *H04L 67/28* (2013.01); *H04W 4/70* (2018.02); *H04W 4/90* (2018.02); *H04W 12/0802* (2019.01); *G07C 2209/08* (2013.01)

(58) Field of Classification Search
None
See application file for complete search history.

(56) References Cited

U.S. PATENT DOCUMENTS

| 4,652,862 | A | * | 3/1987 | Verslycken | ............. | E05B 47/00 |
|---|---|---|---|---|---|---|
| | | | | | | 109/21 |
| 5,552,766 | A | * | 9/1996 | Lee | ......................... | E05G 5/003 |
| | | | | | | 109/3 |
| 6,859,145 | B2 | * | 2/2005 | Wilker | .................... | G08B 7/066 |
| | | | | | | 340/539.14 |
| 7,634,565 | B2 | | 12/2009 | Goffin et al. | | |
| 9,208,676 | B2 | | 12/2015 | Fadell et al. | | |
| 9,489,825 | B1 | * | 11/2016 | McDonnell | .......... | G08B 27/001 |
| 2005/0071879 | A1 | | 3/2005 | Haldavnekar et al. | | |
| 2006/0230270 | A1 | * | 10/2006 | Goffin | .................... | G08B 25/10 |
| | | | | | | 713/173 |

(Continued)

FOREIGN PATENT DOCUMENTS

| WO | WO-2010132981 A1 * 11/2010 ........... E05B 47/026 |
|---|---|
| WO | WO 2014/171620 A1 10/2014 |

OTHER PUBLICATIONS

Anderson, Howard (WO 2010/132981 A1) "Emergency Response System" May 2010 (whole document).*

(Continued)

*Primary Examiner* — Chico A Foxx
(74) *Attorney, Agent, or Firm* — Alston & Bird LLP

(57) ABSTRACT

A method, apparatus and computer program product are provided in order to assist with the provision of timely emergency services. In the context of a method, an indication of an emergency condition is received and, following receipt of the indication of the emergency condition, a request is then received for temporary access to and control of the one or more smart objects. Following receipt of the request for temporary access and in response to a determination that temporary access is authorized, the method includes proxying access commands to the one or more smart objects.

20 Claims, 6 Drawing Sheets

(56) References Cited

U.S. PATENT DOCUMENTS

| | | | |
|---|---|---|---|
| 2006/0250578 A1 | 11/2006 | Pohl et al. | |
| 2009/0177336 A1* | 7/2009 | McClellan | B60R 25/2018 |
| | | | 701/2 |
| 2010/0207723 A1* | 8/2010 | Cao | G07C 9/00309 |
| | | | 340/5.61 |
| 2010/0269553 A1* | 10/2010 | Zhong | E05B 47/00 |
| | | | 70/91 |
| 2011/0050390 A1* | 3/2011 | Denison | B60R 25/102 |
| | | | 340/5.51 |
| 2013/0166910 A1* | 6/2013 | Wilkinson | H04L 9/0861 |
| | | | 713/168 |
| 2014/0304381 A1 | 10/2014 | Savolainen et al. | |
| 2014/0305747 A1* | 10/2014 | Kumar | B66B 1/468 |
| | | | 187/381 |
| 2015/0054644 A1 | 2/2015 | Kowalski et al. | |
| 2015/0074003 A1* | 3/2015 | Tickner | G06Q 30/0645 |
| | | | 705/307 |
| 2015/0116107 A1* | 4/2015 | Fadell | G08B 19/005 |
| | | | 340/501 |
| 2015/0117619 A1* | 4/2015 | Carpenter | H04M 3/5116 |
| | | | 379/39 |
| 2015/0156031 A1* | 6/2015 | Fadell | H04L 12/2816 |
| | | | 700/276 |
| 2017/0372550 A1* | 12/2017 | Lin | H04W 4/90 |

OTHER PUBLICATIONS

Buza, K. et al., *Fast Classification of Electrocardiograph Signals via Instance Selection*, Healthcare Informatics, Imaging and Systems Biology (HISB), 2011 First IEEE International Conference (Jul. 2011) 8 pages.

Ur, B. et al., *The Current State of Access Control for Smart Devices in Homes*, Workshop on Home Usable Privacy and Security (HUPS), (Jul. 2013) 1-6.

*Emergency Response Official Credentials: An Approach to Attain Trust in Credentials Across Multiple Jurisdictions for Disaster Response and Recovery*, A Smart Card Alliance White Paper, Pub. No. IC-08001 (Oct. 2008) 28 pages.

THREAD (Powerpoint) Thread Group (Sep. 30, 2014) 54 pages.

* cited by examiner

Lock Object:

| Resource Name | ID | Access Type | Type | Units | Description |
|---|---|---|---|---|---|
| Location | 0 | R | String | | Location of the lock |
| Lock status | 1 | R/W | Boolean | | Boolean status describing whether lock is locked or not |

Adding new Emergency Access type resource:

| Resource Name | ID | Access Type | Type | Units | Description |
|---|---|---|---|---|---|
| Location | 0 | R | String | | Location of the lock |
| Lock status | 1 | R/W | Boolean | | Boolean status describing whether lock is locked or not |
| Emergency access type | 2 | R | Integer | | 0 = silent access allowed, 1 = user will be notified, 2 = user consent will be queried |

FIG. 6A

New Access Type Object:

| ID | Operation | Mandatory | Type | Description |
|---|---|---|---|---|
| Access type | R | Optional | Object array | Array of items describing object URI and access type to it. <br> • E.g. {"access_types":[{"uri":"/1000/0/", "access_type":12}, {"uri":"/1000/1/1","access_type":1}]} <br> Access_type definitions as bit field define as follows: <br> • Bit 1: set if user notified on read <br> • Bit 2: set if user notified on write <br> • Bit 3: set if user queried on write <br> • Bit 4: set if user queried on read |

FIG. 6B

METHOD AND APPARATUS FOR PROXYING ACCESS COMMANDS TO SMART OBJECT(S) IN RESPONSE TO AN EMERGENCY CONDITION

TECHNOLOGICAL FIELD

A method, apparatus and computer program product are provided in accordance with an example embodiment in order to facilitate the timely provision of emergency services and, more particularly, to proxying access commands to allow an emergency responder to control smart objects during their response to an emergency condition.

BACKGROUND

Various emergency conditions may arise, such as medical emergencies, a fire or the like. In order to address the emergency conditions, the timely response of emergency responders is of importance. However, the response time of the emergency responders may be inhibited in some instances by various smart objects, such as locked gates and doors, a security system, etc.

By way of example, an individual may require medical assistance with the responsiveness with which the medical assistance is provided oftentimes being of importance with respect to the manner in which the individual recovers, if at all. It may sometimes be difficult, however, for an individual who requires medical assistance to grant access to a medical response service that is arriving to the individual's home to provide the medical assistance. For example, in instances in which an individual is alone and is stricken with a medical emergency, the individual may be unable to unlock the front door and to turn on lights to allow a medical response service, such as a police department, the emergency response unit of a hospital or other emergency responder, to quickly reach the individual in need of medical assistance. In this regard, the medical emergency may render the individual unconscious or otherwise unable to unlock the front door or turn on lights such that the timeliness with which the individual receives medical assistance is delayed. This delay may, in turn, have a deleterious impact upon the recovery of the individual from the medical condition.

In a more particular example, an individual may be in the bathroom at home and suffering from a heart attack which may render the individual unable to turn off the security system and unlock both the front door and bathroom door so that a medical response unit can provide medical assistance. As such, the individual may be required to wait until the medical response unit breaks down both doors to reach the individual. The delay in the individual receiving medical attention may disadvantageously impact the recovery of the individual from the heart attack, thereby potentially putting at risk the recovery of the individual from their medical condition.

BRIEF SUMMARY

A method, apparatus and computer program product are provided according to an example embodiment in order to notify and grant access control to an emergency responder such that emergency services including medical assistance may be provided in a timelier manner. In this regard, the method, apparatus and computer program product of an example embodiment are not dependent upon the user experiencing the emergency condition manually providing access, but may independently grant access and control of one or more smart objects to the emergency responders, even in an instance in which the user is unable to authorize control of the one or more smart objects due to, for example, the onset of the emergency condition. Thus, the method, apparatus and computer program product of an example embodiment may allow the user to receive a more timely response to the emergency condition which may, in the context of a medical emergency, facilitate the recovery from the medical condition.

In one embodiment, a method is provided that includes receiving an indication of an emergency condition and, following receipt of the indication of the emergency condition, receiving a request for temporary access to and control of the one or more smart objects. In this embodiment, following receipt of the request for temporary access and in response to a determination that temporary access is authorized, the method includes proxying access commands to the one or more smart objects.

The method of an example embodiment also includes proxying a response from the one or more smart objects to the access commands and alerting an emergency responder of the response from the one or more smart objects. The method of an example embodiment also includes causing an emergency service to be contacted in response to receipt of the indication of the emergency condition and causing a list of one or more smart objects that are available to be transmitted. In an example embodiment, the method also includes causing an authorization request for the one or more smart objects to be directed to a user in response to receipt of the request for temporary access and, in response to a failure to receive a response from the user to the authorization request, authorizing temporary access following a lapse of at least a predetermined time following direction of the authorization request to the user.

The method of an example embodiment also collects a list of one or more smart objects that are available in response to receipt of the indication of an emergency condition. In an example embodiment, the method adds an emergency access type resource to an object description associated with the smart object. In another embodiment, the method creates a data object comprising a list of the one or more smart objects with an emergency access type resource defined for each smart object in the list of available one or more smart objects. In an example embodiment, a method also includes receiving a revocation of the temporary access from the user and, in response to the received revocation of the temporary access from the user, revoking the temporary access and cancelling the access commands to the one or more smart objects.

In another embodiment, an apparatus is provided that includes at least one processor and at least one memory including computer program code with the at least one memory and the computer program code configured to, with the processor, cause the apparatus to at least receive an indication of an emergency condition and, following receipt of the indication of the emergency condition, receive a request for temporary access to and control of the one or more smart objects. In this embodiment, following receipt of the request for temporary access and in response to a determination that temporary access is authorized, the at least one memory and the computer program code are configured to, with the processor, cause the apparatus to proxy access commands to the one or more smart objects.

The at least one memory and the computer program code are further configured to, with the processor, cause the apparatus of an example embodiment to proxy a response from the one or more smart objects to the access commands and alert an emergency responder of the response from the one or more smart objects. The at least one memory and the computer program code are further configured to, with the processor, cause the apparatus of an example embodiment to cause an emergency service to be contacted in response to receipt of the indication of the emergency condition and to cause a list of one or more smart objects that are available to be transmitted. In an example embodiment, the at least one memory and the computer program code are further configured to, with the processor, cause the apparatus to cause an authorization request for the one or more smart objects to be directed to a user in response to receipt of the request for temporary access and, in response to a failure to receive a response from the user to the authorization request, to authorize temporary access following a lapse of at least a predetermined time following direction of the authorization request to the user.

The at least one memory and the computer program code are further configured to, with the processor, cause the apparatus of an example embodiment to collect a list of one or more smart objects that are available in response to receipt of the indication of an emergency condition. In an example embodiment, the at least one memory and the computer program code are further configured to, with the processor, cause the apparatus to add an emergency access type resource to an object description associated with the smart object. In another embodiment, the at least one memory and the computer program code are further configured to, with the processor, cause the apparatus to create a data object comprising a list of the one or more smart objects with an emergency access type resource defined for each smart object in the list of available one or more smart objects. In an example embodiment, the at least one memory and the computer program code are further configured to, with the processor, cause the apparatus to receive a revocation of the temporary access from the user and, in response to the received revocation of the temporary access from the user, revoke the temporary access and cancelling the access commands to the one or more smart objects.

In a further embodiment, a computer program product is provided that includes at least one non-transitory computer-readable storage medium having computer-executable program code portions stored therein with the computer-executable program code portions including program code instructions for receiving an indication of an emergency condition and, following receipt of the indication of the emergency condition, receiving a request for temporary access to and control of the one or more smart objects. Following receipt of the request for temporary access and in response to a determination that temporary access is authorized, the computer-executable program code portions also include program code instructions for proxying access commands to the one or more smart objects.

The computer-executable program code portions of an example embodiment also include program code instructions for proxying a response from the one or more smart objects to the access commands and alerting an emergency responder of the response from the one or more smart objects. In an example embodiment, the computer-executable program code portions also include program code instructions for causing an emergency service to be contacted in response to receipt of the indication of the emergency condition and causing a list of one or more smart objects that are available to be transmitted. The computer-executable program code portions of an example embodiment also include program code instructions for causing an authorization request for the one or more smart objects to be directed to a user in response to receipt of the request for temporary access and, in response to a failure to receive a response from the user to the authorization request, authorizing temporary access following a lapse of at least a predetermined time following direction of the authorization request to the user.

In yet another example embodiment, an apparatus is provided that includes means for receiving an indication of an emergency condition and, following receipt of the indication of the emergency condition, means for receiving a request for temporary access to and control of the one or more smart objects. In this embodiment, following receipt of the request for temporary access and in response to a determination that temporary access is authorized, the apparatus also includes means for proxying access commands to the one or more smart objects.

BRIEF DESCRIPTION OF THE DRAWINGS

Figure 1:
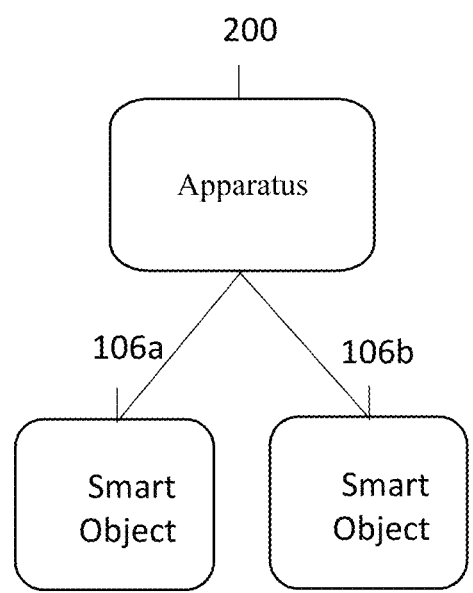
Figure 2:
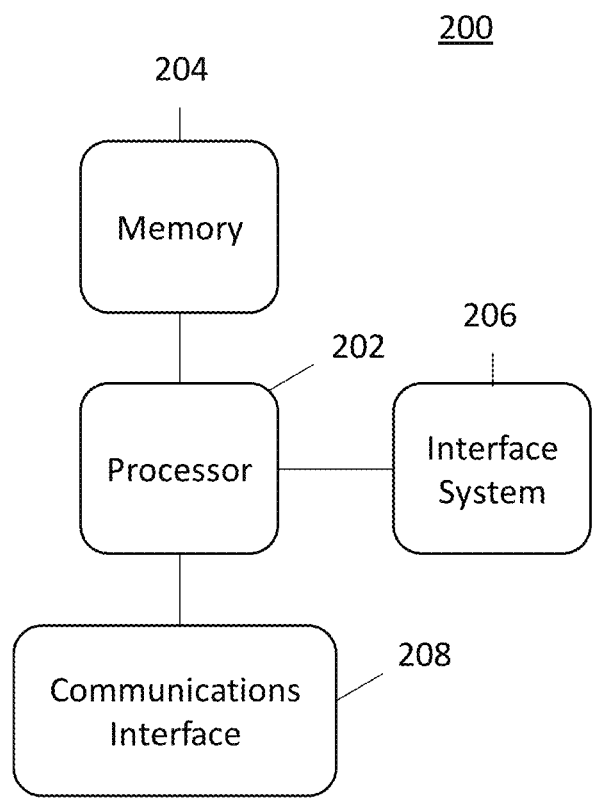
Figure 3:
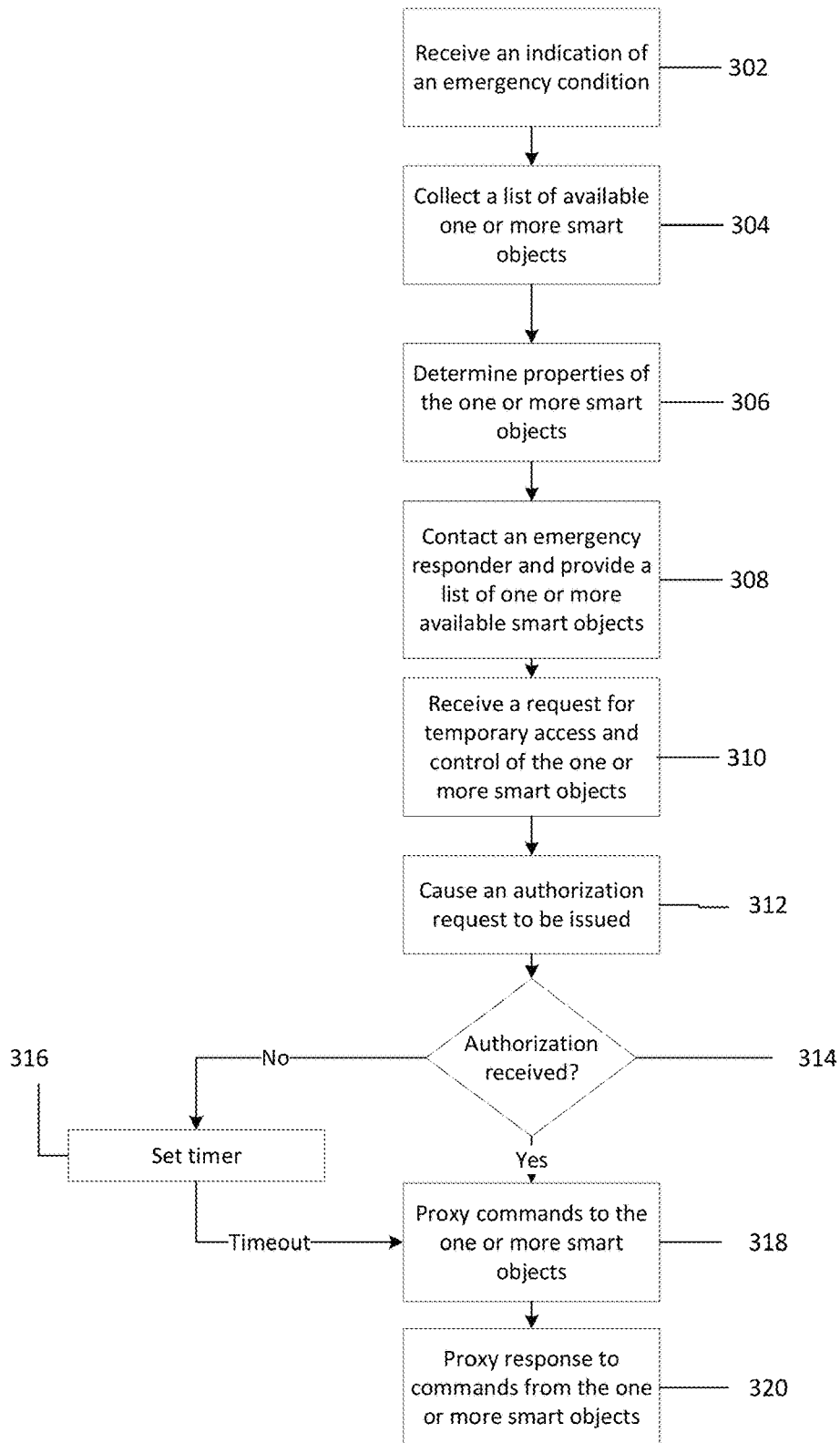
Figure 4:
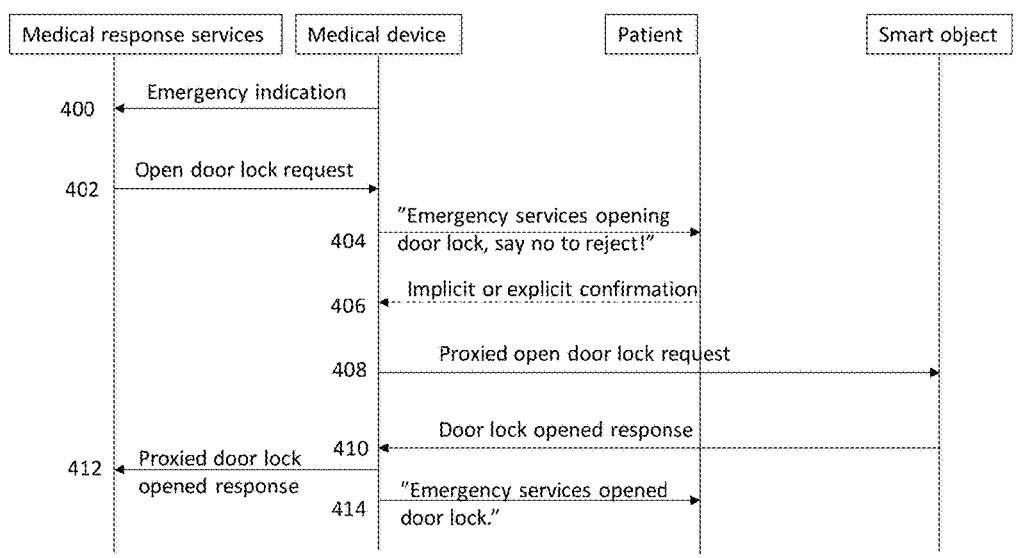
Figure 5:
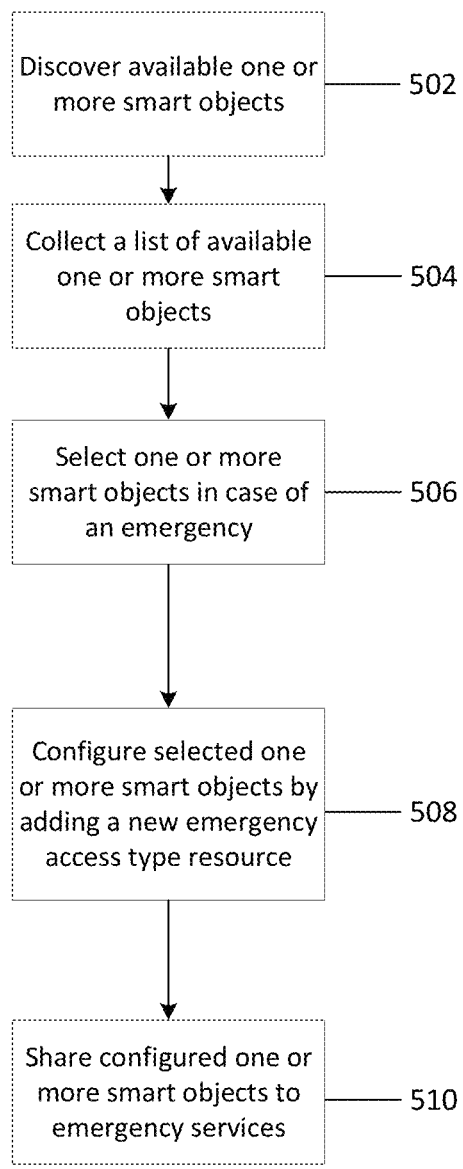

Having thus described certain example embodiments of the present disclosure in general terms, reference will hereinafter be made to the accompanying drawings, which are not necessarily drawn to scale, and wherein:

FIG. 1 is an example of a smart-home environment that may be subject to control by the apparatuses, methods, and/or computer program products described further herein, according to an example embodiment of the present invention;

FIG. 2 is a block diagram of an apparatus that may be specifically configured in accordance with an example embodiment of the present invention;

FIG. 3 is a flowchart illustrating operations performed, such as by the apparatus of FIG. 2, in accordance with an example embodiment of the present invention;

FIG. 4 is a sequence diagram in accordance with an example embodiment of the present invention;

FIG. 5 is a flowchart illustrating operations performed, such as by the apparatus of FIG. 2, in accordance with an example embodiment of the present invention; and FIGS. 6A and 6B illustrate a configuration setup in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Aspects of the disclosure include a method and apparatus for controlling smart objects which provide affordances related to access control. Such a method and apparatus benefit both the individual suffering from an emergency condition, such as a person needing medical assistance, and the emergency responders arriving at the home or other facility at which the individual is located in order to address the emergency condition by allowing the emergency responders to access and control smart objects in the home or other facility in order to reach the individual or otherwise address the emergency condition in a timely manner. The term "smart object" in this context should be understood to mean physical devices or objects connected together and configured to communicate with one another using emerging technologies such as sensors, radio frequency identification (RFID), Bluetooth, near-field communications (NFC), wireless local area network (WLAN) or cellular communication techniques. For example, the smart objects may be included within an Internet of Things (IoT) which may include a variety of interconnected devices. Within the IoT, a smart object may be an autonomous, physical digital object augmented with sensing/actuating, processing, storing, and networking capabilities and configured to sense/actuate, store, and interpret information created within themselves and around the neighboring external world where the smart object is situated, act on their own, cooperate with other smart objects, and exchange information with other kinds of electronic devices and human users.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided for controllably providing temporary access to and control over one or more smart objects in an instance in which a subject is experiencing an emergency condition, such as a person requiring medical assistance. By way of example, the emergency condition will generally be described herein as a medical emergency. However, the method, apparatus and computer program product of an example embodiment may facilitate the provision of emergency services in response to other types of emergency conditions including, for example, a fire. In the context of a medical emergency, however, the method, apparatus and computer program product of an example embodiment may determine that medical assistance is required based upon an indication of an emergency condition which may be provided by the user or by a device associated with the user, such as a medical monitoring device, a smoke alarm, a carbon dioxide monitor, etc. In one example embodiment, the apparatus acts as a proxy over communications from the user, such as communications conducted over a cellular connection or a local short range connection (such as local Bluetooth LE connection). As shown in FIG. 1, for example, the apparatus 200 may act as a control proxy to connected smart objects 106a and 106b. To prevent potential risks such as allowing unwanted access and control, a user may be notified of the request by an emergency responder for access and control and, in some embodiments, must first grant permission before access and control is established.

The apparatus 200 of one embodiment may be configured as shown in FIG. 2. The apparatus may be entirely embodied by the device associated with the user in one embodiment. In other embodiments, apparatus is associated with the device and is in communication with the device, but is physically separate from the device. For example, the interface system 206 may be embodied by the device, but one or more of the elements of the apparatus, such as the processor 202, the memory 204 and/or the communication interface 208, may be embodied by another device, such as a mobile terminal, such as a mobile terminal carried by the user. In this regard, the mobile terminal that may embody one or more elements of the apparatus may include, for example, a wearable device, such as an arm-band or smart watch, a mobile telephone, a smartphone, a personal digital assistant (PDA), a tablet computer, a laptop computer, a touch surface, a gaming device, a camera, an electronic book, a pager, a mobile television, a gaming device, a camera, a video recorder, an audio/video player, a radio, a positioning device (e.g., global positioning system (GPS) device), or any combination of the aforementioned, and other types of voice and text communications systems. In these embodiments in which the interface system(s) is separate from one or more other elements of the apparatus, the interface system(s) embodied by the device may be in communication with the other elements of the apparatus, such as may be supported by the communication interface, by either wireless communications or wireline communications. In an instance in which the interface system(s) are in communication with the other elements of the apparatus via wireless communications, the wireless communications may include proximity based wireless communication techniques, such as communications via wireless local area network, Bluetooth or the like, or a network-based communications, such as communications via a wide area network, e.g., the internet, a cellular network or the like. In at least some embodiments, however, the interface system 206 is co-located with the processor 202, the memory 204 and/or the communication interface 208 and, as such, may be embodied by a mobile terminal as described above.

Regardless of the manner in which the apparatus 200 is embodied, the apparatus may include or otherwise be in communication with a processor 202, a memory device 204 and a communication interface 208. In some embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 208 may be any means such as a device or circuitry embodied in either hardware or a combination of hardware and software that is configured to receive and/or transmit data, such as by supporting communications with the interface system(s) 206 and/or a medical response service. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms The method, apparatus 200 and computer program product of an example embodiment will now be described in conjunction with the operations illustrated in FIG. 3. In this regard, the apparatus includes means, such as the processor 202, the communications interface 208 or the like, for receiving an indication of an emergency condition. See block 302. For example, the indication may be provided automatically by the device, such as in an instance in which a medical monitoring device detects one or more medical parameters satisfying predefined limits, or in an instance in which a smoke alarm, a carbon dioxide monitor or other similar device detects an emergency condition and issues an alert. Additionally or alternatively, the indication may be provided by a user, such as via the interface system 206. In the context of a medical emergency, for example, the apparatus, such as the processor, of an example embodiment may be configured to determine that the user is considered to require medical assistance in various manners. For example, the apparatus, such as the processor, may compare predefined acceptable values or ranges, such as may be stored by the memory device 204, to the medical parameters provided by the medical monitoring device. In this example, the apparatus, such as the processor, will not consider the user to require medical assistance so long as the medical parameters satisfy or are otherwise consistent with the acceptable value(s) or range. However, in an instance in which the medical parameters provided by the medical monitoring device deviates from the acceptable value(s) or range, the apparatus, such as the processor, may consider the subject to require medical assistance.

As shown in block 304 of FIG. 3, the apparatus 200 may include means, such as the processor 202, the communications interface 208 or the like, collecting a list of available one or more smart objects that are in communication with the apparatus, such as the smart objects in the home or other building in which the user is located in order to gain access and control of the one or more smart objects, such as described below. The list may be collected in various manners including by accessing list of smart objects stored by memory 204 or by polling the smart objects in proximity to the apparatus in order to identify the smart objects and construct the list. Although a list of available smart objects may be collected in response to receipt of an indication of an emergency condition, the apparatus, such as the processor, of an example embodiment may, instead, access and utilize a preexisting list of smart objects, either in its predefined form or as updated in response to the receipt of an indication of an emergency condition. Regardless of the manner in which the list of smart objects is constructed, the list of available smart objects may include information regarding the one or more smart objects, such as related application information and network connection information. In some embodiments, the list of smart objects is prioritized based upon the importance of the smart objects in relation to providing access to the user. Thus, door locks, the security system and the lights may be of more importance in this context than the home entertainment system.

In addition to collecting the list of available smart objects, the apparatus 200 of an example embodiment also includes means, such as the processor 202, the communication interface 208 or the like, for determining the properties of the one or more smart objects including the manner in which the one or more smart objects may be controlled and/or the manner in which to communicate with the one or more smart objects. See block 306 of FIG. 3. This determination of smart object properties may occur in conjunction with the collection of the list of smart objects, in advance of the collection of the list with the smart object properties stored, for example, in memory 204, or at some time thereafter. For example, the apparatus, such as the processor and/or the memory, may store information regarding various properties of the smart objects, such as may be provided by the smart objects, including, for example, the protocol for communicating with and/or controlling the smart objects. With reference to FIG. 1, smart objects 106a and 106b and apparatus 200 may communicate using any one of several client-server protocols, such as the Open Mobile Alliance (OMA) Device Management (DM) protocol. Other example protocols for communication with and control of smart objects include Netconf, Yang, Constrained Application Protocol (CoAP), Extensible Markup Langauge (XML) and Message Queuing Telemetry Transport (MQTT) protocols. For example, the apparatus and smart objects could utilize a Representational State Transfer (REST) Application Programming Interface (API) for medical response services for which access to an automated smart home in case of an emergency needs to be provided (e.g. using CoAP or HyperText Transport Protocol (HTTP)). The API could also be a publish and subscribe API (e.g., using MQTT, or any other protocol system).

In response to receipt of an indication of an emergency condition, the apparatus 200 may also include means, such as the processor 202, the communications interface 208 or the like, for contacting an emergency responder, such as an ambulance service, fire department, police department or the like. See block 308. The apparatus, such as the processor or the communications interface, may cause the emergency responder to be notified in various manners, such as by causing provision of a message notifying the emergency responder of the person in need of assistance. Additionally or alternatively, the apparatus, such as the processor, communication interface or the like, may cause notification to be provided by causing transmission of a text message, a short message service (SMS) message or other type of message, such as messages formatted in accordance with the Transmission Control Protocol (TCP)/Internet Protocol (IP) protocol suite. Regardless of the type of notification, the apparatus includes means, such as the processor, the communications interface or the like, for causing notification of an emergency responder of the emergency condition.

In addition to contacting an emergency responder, the apparatus, such as the processor, of an example embodiment has received information regarding the emergency condition, such as the medical condition of a user from a medical monitoring device or the nature of the emergency condition, e.g., fire or carbon monoxide leak, from a smoke detector or carbon monoxide monitor, and may provide the information regarding the emergency condition to the emergency responder. Thus, the apparatus of an example embodiment may contact a general emergency service and rely upon the emergency service to dispatch the appropriate emergency responders based upon the information regarding the emergency condition. In addition and as also shown in block 308, the apparatus, such as the processor, the communications interface or the like, may cause the collected list of available one or more smart objects to be provided to the emergency responder. The apparatus, such as the processor, the communication interface or the like, may contact various medical response services, such as by notifying one or more emergency or first response services, such as emergency medical technicians, police or fire department personnel or the like.

Based upon the list of smart objects and the nature of the emergency condition, the emergency responder may determine the smart objects for which the emergency responder desires to control during the provision of the emergency services, e.g., the security system, door locks and lights for a medical emergency. The emergency responder may issue a request to the apparatus 200 for access to and control of the smart objects that the emergency responder wishes to control. As such, the apparatus 200 also includes means, such as the processor 202, the communication interface 206 or the like, for receiving the request for temporary access to and control of the one or more smart objects. See block 310 of FIG. 3.

In order to prevent unauthorized access and control, the apparatus 200 of an example embodiment includes means, such as the processor 202, the interface system 206, the communication interface 208 or the like, for causing an authorization request for one or more of the smart objects to be directed to the user. See block 312. As such, the user may alerted to a nearby emergency responder requesting access and control. The user may affirmatively provide the authorization, such as by providing an input via the interface system. See block 314. The authorization may be provided in various manners including via an electronic message. In some embodiments, however, the authorization request is provided via speech-based communications along with a notification sent to the user once access has been granted. In an embodiment in which the authorization request is provided via speech-based communications, the apparatus of an example embodiment is configured to receive a verbal input providing the authorization from the user, while the apparatus of another embodiment is configured to receive a physical input from the user, such as the touch or depression of a button, in order to provide the authorization. The authorization may be specific to the smart object so as to individually allow access to and control of each smart object, without necessarily providing a one-time authorization for all available smart objects. In an example embodiment, however, the apparatus includes means, such as the processor or the like, for setting a timer to a predetermined time in response to the request from the emergency responder to allow for time for the user to consider the request for temporary access and control. See block 316. Once the predetermined time has reached expiration without a response from the user, as may occur in certain situations where the subject is unable to respond, the apparatus of an example embodiment includes means, such as the processor or the like, for authorizing temporary access.

Once temporary access and control is authorized, the apparatus 200, such as the processor 202, the communications interface 208 or the like, is configured to act as a proxy to manage the one or more available smart objects for which authorization has been granted. The apparatus of this embodiment includes means, such as the processor, the communication interface or the like, for proxying access commands to the one or more smart objects. See block 318.

These access commands allow the emergency responder access to and control of the respective smart objects such that the emergency responder can control the state, e.g., lock/unlock, on/off, etc., of the smart objects, at least temporarily while responding to the emergency condition. The apparatus of an example embodiment may also include means, such as the processor, the communication interface or the like, for proxying the response from the one or more smart objects to the access commands and, in turn, alerting the emergency responder of the response from the one or more smart objects. See block 320. Thus, the emergency responder may be notified that they have been granted temporary access and control of the smart objects. In relation to granting access and control, a proxy control API of the apparatus and/or the smart objects may be controlled by access credentials, e.g. ones that are explicitly given to preconfigured contacts or emergency responders for the duration of the emergency condition. Or as in another embodiment, the API could be "available" all the time to a cloud to which the apparatus is connected. However, in such cases, the apparatus would allow actions to be taken only in case of an emergency condition and also when authorized.

Furthermore, the user may cancel and revoke the access and control that has previously been authorized for the emergency responders. In this embodiment, the apparatus 200 includes means, such as the processor 202, the communications interface 208 or the like, for receiving a revocation of the temporary access from the user. In response to the received revocation of the temporary access from the user, the apparatus also includes means, such as the processor, the communications interface or the like, for revoking the temporary access and cancelling the access commands to the one or more smart objects.

Furthermore, the apparatus 200 of an example embodiment includes means, such as the processor 202, the memory 204 or the like, for compiling a log that captures access and control information, such as for storage in memory. The log provides an auditing mechanisms to monitor when and understand why smart objects were accessed. In some embodiments, the user is notified, such as by an electronic message or speech-based communications, of the access by the emergency responder to a respective smart object. In other embodiments, however, access to some smart objects is allowed without notification to the user of the access. However, in this instance, a log would capture this access.

As described above, the apparatus 200 of an example embodiment may require notification of and consent by a user prior to providing an emergency responder with control of and access to any smart object. This notification and consent may be provided collectively on behalf of all smart objects for which access and control was requested or individually for each respective smart object for which access and control was requested. In other embodiments, the apparatus 200, such as the processor 202, is configured to treat the smart objects differently in terms of whether notification of and/or consent by the user is required in response to a request by an emergency responder for access and control. In this regard, the memory 204 may store information associated with the respective smart objects defining the type of notification and consent that is required for each individual smart object for which access and consent is requested.

In this embodiment, access and control of some smart objects may be granted upon request without any notification of the user and, as a result, without any consent by the user. For other smart objects, verbal notifications might be given, but no user consent is requested (e.g. there could be notification that an emergency responder has requested access to turn on the lights, but no explicit confirmation is requested as whether such actions should be allowed). Then for yet other smart objects, explicit confirmation would be requested, for example, in such cases to allow the opening of a locked door or accessing of a surveillance camera feed.

As such, in an instance in which the apparatus 200, such as the processor 202, determines that access is requested for one or more smart objects, the apparatus, such as the processor, may be configured to determine whether in the event of an emergency condition, which one the following which types of access is applicable, assuming that access is permitted upon satisfaction of the predefined conditions: 1) Silent 2) Notify or 3) Request, such as based upon information stored by the memory 204 that associates a respective type of access with each individual smart object. As defined herein, "Silent" type refers to access to smart objects, e.g., lights, upon request without authorization from the user and without notification the user. "Notify" type refers to the provision of access to smart objects upon request upon notifying the user, but without solicitation of authorization from the user. Further, the "Request" type refers to the provision of access to smart objects only in response to both notification of and authorization by the user. In such an instance, a default authorization may be granted for a "Request" type of smart object after a predetermined period of time as described above. In this embodiment, once the apparatus, such as the processor, has determined the type of access that is application for a respective smart object, the apparatus, such as the processor, is configured to provide notification and seek authorization, if so required, and to then grant temporary access and control as described above dependent upon the user's authorization, if so required.

As noted above, the memory 204 may store a list of smart objects, such as those smart objects in proximity to and configured to communicate with the apparatus 200, and may associate a type of notification and authorization, if any, that is required for the respective smart object. For example, the memory may store the following:
/device/light/living_room/access=silent
/device/light/bedroom/access=request
/device/camera/front_yard/access=notify
/device/camera/living_room/access=request
/device/camera/bedroom/access=request
/device/lock/garden_gate/access=notify
/device/lock/front-door/access=request
/device/lock/garage-door/access=notify
/device/sensor/smoke_living_room/access=silent
/device/sensor/smoke_kitchen_room/access=silent
/device/sensor/smoke_toilet_room/access=silent
/device/sensor/smoke_garage_room/access=silent
/device/sprinkler/living_room/access=request
/device/sprinkler/front_yard/access=notify Thus, following collection of the foregoing list of smart objects and the transmission of the list of smart objects to the emergency responder, the emergency responder could determine what smart objects are available and which smart objects require user consent as opposed to those smart objects for which access is allowed without any extra notification to the user. By allowing access to and control of some smart objects without requiring user authorization, the burden imposed upon the user to consider and respond to requests for authorization is lessened. Regardless of the type of smart object, at any point when the emergency responder is accessing the smart object, the user is allowed to cancel or revoke the access and control that has been provided to the emergency responder, as described above.

FIG. 4 illustrates a sequence diagram for an example embodiment. With signal 400, the apparatus 200, such as may be embodied by or otherwise associated with a device, such as a medical monitoring device, informs the emergency responder of the emergency condition and provides a list of smart objects that the emergency responders are potentially allowed to access. With signal 402, an emergency responder requests to open a door lock. With signal 404, the user, e.g., patient, is informed about emergency responders' request to access lock, and provided the opportunity to affirmative respond to the request, such as by rejecting the request for access, dependent upon the type of access that is associated with the smart object. At 406 and dependent upon the type of access that is associated with the smart object, the user provides implicit or explicit authorization in response to the request based on the type of access. Although the emergency responder may be informed that they have been authorized to access and control the smart object, e.g., the door lock, as described above, signal 408 of this example embodiment forwards the authorization provided in response to the open door lock request to the door lock and the door lock is then unlocked at block 410. At block 412 emergency responders are informed that door is now unlocked, and at block 414 the user is informed that door is now unlocked by emergency workers.

As described earlier, the method, apparatus and computer program product of an example embodiment may collect a list of available one or more smart objects. The method, apparatus 200 and computer program product of an example embodiment will now be described in conjunction with the operations illustrated in FIG. 5. In this regard, the apparatus includes means, such as the processor 202, the communications interface 208 or the like, for discovering one or more smart objects that are available as shown in block 502. Discovery can be implemented in a multitude of ways including, for example, by using IP-multicast queries to find smart objects, listening for smart objects' advertisements, such as Bluetooth Low-Energy advertisements or IP multicast advertisements, or accessing a repository or registry, such as maintained by memory 204, that has previously stored smart objects in the proximity of the apparatus. As shown in block 504, the apparatus, such as the processor or the like, may therefore be configured to collect a list of available one or more smart objects in proximity to and in communication with the apparatus in order to selectively provide access and control of the one or more smart objects to an emergency responder. In collecting the list of available one or more smart objects, Universal Resource Identifiers (URIs) associated with the smart objects are also determined to facilitate communication with and configuration of the smart objects as described further below. One example of techniques for communicating with smart objects is described in US Patent Application Publication No. 2014/0304381, which is herein incorporated by reference in its entirety.

During a configuration process, such as may be performed upon initialization of the system or as other smart objects are added, the apparatus 200 may include means, such as the processor 202, the communications interface 208 or the like, for selecting one or more smart objects (from among the smart objects on the list that has been collected) for which access and control is to be offered to an emergency responder in case of an emergency condition. This initial selection of the smart objects may be performed by the user, the system designer, a service provider, or the apparatus itself based on preconfigured rules as established during implementation or standardization. The access type associated with each smart object may also be defined at this stage, such as by the user, system designer, service provider, or the apparatus itself based on predetermined user privacy and security rules. Once one or more smart objects are selected for access and control, the apparatus, such as the processor, configures the selected smart object by adding an emergency access type resource as shown in block 508 that defines, potentially among other things, the access type of the respective smart object. The emergency access type may be added to an existing object description associated with a smart object, or a new data object may be created that includes all of the smart objects and their respective access type. In this embodiment in which a new data object is created, the new data object includes the URIs of available smart objects and an indication of the type of access for the smart objects. The creation of a new data object in this embodiment is beneficial in that object descriptions associated with smart objects are not manipulated, thereby preserving the "raw" values of the object descriptors. Finally, the new data object including information regarding the one or more smart objects may be shared with an emergency responder, such as in response to an emergency condition, as shown in block 510.

The smart objects' descriptors may be configured through the Open Mobile Alliance Lightweight Machine to Machine (OMA LWM2M) protocol. As shown in FIG. 6A, the smart object, "Lock Object" may be standardized, such as utilizing OMA LWM2M defined standard resource types. These OMA LWM2M objects/resources are accessed via URIs (e.g. by using HTTP/COAP): /{Object ID}/{Object Instance}/{Resource ID}. As such, a URI of Lock Object /1000/0/1/ refers to Lock Object ID 1000 with 0 being an instance of the Lock Object describing location of the lock. As shown in FIG. 6A, the same Lock Object may be associated with a lock status which indicates whether the lock is locked or not. In an example embodiment, the apparatus 200 may configure the Lock Object by adding a new resource: "Emergency access type" with ID 2 and an access type that indicates the type of authorization and/or notification that is required. In this regard, an access type of 0 indicates that silent access allowed, an access type of 1 indicates that the user will be notified, and an access type of 3 indicates that user consent will be required.

In another embodiment, the apparatus 200, such as the processor 202 or the like, may be configured to add a new OMA LWM2M object that describes the access type for each smart object from the list of available smart objects. In this embodiment, the original object descriptors of the smart object are preserved and not modified. As shown in FIG. 6B, the new data object includes object URIs that reference respective smart objects for which the apparatus is proxying access. An access type is associated with each object URI indicating, for example, if the user is notified on read, if the user is notified on write, if user authorization is required on write and if user authorization is required upon read. The access type allows granularity at the object level or at the level of an individual resource within the object as shown for example in FIG. 6B.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus 200 employing an embodiment of the present invention and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of an emergency condition;
   in response to the reception of the indication of the emergency condition, polling one or more smart objects to obtain properties for the respective one or more smart objects;
   following receipt of the indication of the emergency condition, receiving a request for temporary access to and control of the one or more smart objects;
   following receipt of the request for temporary access to and control of the one or more smart objects, determining an emergency access type associated with each of the one or more smart objects based on respective properties obtained, wherein the emergency access type indicates a type of authorization and a type of consent required prior to providing temporary access to and control of each of the one or more smart objects; and
   operating as a proxy, between an emergency responder and a subject experiencing the emergency condition, to manage the one or more smart objects once temporary access is authorized according to the determined emergency access type associated with each of the one or more smart objects.

2. A method of claim 1, further comprising operating a proxy response from the one or more smart objects to the access commands and alerting the emergency responder of the response from the one or more smart objects.

3. A method of claim 1, further comprising causing the emergency responder to be contacted in response to receipt of the indication of the emergency condition and causing a list of one or more smart objects that are available to be transmitted.

4. A method of claim 1, further comprising:
   causing an authorization request for the one or more smart objects to be directed to the subject in response to receipt of the request for temporary access; and
   in response to a failure to receive a response from the subject to the authorization request, authorizing temporary access following a lapse of at least a predetermined time following direction of the authorization request to the subject.

5. A method of claim 4, further comprising:
   receiving a revocation of the temporary access from the subject; and
   in response to the received revocation of the temporary access from the user, revoking the temporary access and cancelling the access commands to the one or more smart objects.

6. A method of claim 1, further comprising creating a data object comprising a list of the one or more smart objects with the emergency access type defined for each smart object in a list of available one or more smart objects.

7. A method of claim 1, wherein the emergency access type is set to indicate at least one of (i) silent access allowed without consent, (ii) subject will be notified without consent, or (iii) explicit consent will be required.

8. A method of claim 1, further comprising:
   notifying the subject experiencing the emergency condition to provision of temporary access to and control of the one or more smart objects by the emergency responder; and
   granting authorization to the emergency responder for temporary access to and control of the one or more smart objects according to the indicated type of authorization required.

9. An apparatus comprising at least one processor and at least one memory including computer program code, the at least one memory and the computer program code configured to, with the at least one processor, cause the apparatus to at least:
   receive an indication of an emergency condition;

in response to the reception of the indication of the emergency condition, poll one or more smart objects to obtain properties for the respective one or more smart objects;

following receipt of the indication of the emergency condition, receive a request for temporary access to and control of the one or more smart objects;

following receipt of the request for temporary access to and control of the one or more smart objects, determine an emergency access type associated with each of the one or more smart objects based on respective properties obtained, wherein the emergency access type indicates a type of authorization and a type of consent required prior to providing temporary access to and control of each of the one or more smart objects; and operate as a proxy, between an emergency responder and a subject experiencing the emergency condition, to manage the one or more smart objects once temporary access is authorized according to the determined emergency access type associated with each of the one or more smart objects.

10. An apparatus of claim 9, wherein the at least one memory and the computer program code are further configured to, with the at least one processor, cause the apparatus to operate a proxy response from the one or more smart objects to the access commands and alert the emergency responder of the response from the one or more smart objects.

11. An apparatus of claim 9, wherein the at least one memory and the computer program code are further configured to, with the at least one processor, cause the apparatus to cause the emergency responder to be contacted in response to receipt of the indication of the emergency condition and cause a list of one or more smart objects that are available to be transmitted.

12. An apparatus of claim 9, wherein the at least one memory and the computer program code are configured to, with the at least one processor, cause the apparatus to:
cause an authorization request for the one or more smart objects to be directed to the subject in response to receipt of the request for temporary access; and
in response to a failure to receive a response from the subject to the authorization request, authorize temporary access following a lapse of at least a predetermined time following direction of the authorization request to the subject.

13. An apparatus of claim 12, wherein the at least one memory and the computer program code are further configured to, with the at least one processor, cause the apparatus to:
receive a revocation of the temporary access from the subject; and
in response to the received revocation of the temporary access from the user, revoke the temporary access and cancelling the access commands to the one or more smart objects.

14. An apparatus of claim 9, wherein the at least one memory and the computer program code are further configured to, with the at least one processor, cause the apparatus to create a data object comprising a list of the one or more smart objects with the emergency access type defined for each smart object in a list of available one or more smart objects.

15. An apparatus of claim 9, wherein the emergency access type is set to indicate at least one of (i) silent access allowed without consent, (ii) subject will be notified without consent, or (iii) explicit consent will be required.

16. An apparatus of claim 9, wherein the at least one memory and the computer program code are configured to, with the at least one processor, cause the apparatus to:
notify the subject experiencing the emergency condition to provision of temporary access to and control of the one or more smart objects by the emergency responder; and
grant authorization to the emergency responder for temporary access to and control of the one or more smart objects according to the indicated type of authorization required.

17. A computer program product comprising at least one non-transitory computer-readable storage medium having computer-executable program code portions stored therein, the computer-executable program code portions comprising program code instructions for:
receiving an indication of an emergency condition;
in response to the reception of the indication of the emergency condition, polling one or more smart objects to obtain properties for the respective one or more smart objects;
following receipt of the indication of the emergency condition, receiving a request for temporary access to and control of the one or more smart objects;
following receipt of the request for temporary access to and control of the one or more smart objects, determining an emergency access type associated with each of the one or more smart objects based on respective properties obtained, wherein the emergency access type indicates a type of authorization and a type of consent required prior to providing temporary access to and control of each of the one or more smart objects; and
operating as a proxy, between an emergency responder and a subject experiencing the emergency condition, to manage the one or more smart objects once temporary access is authorized according to the determined emergency access type associated with each of the one or more smart objects.

18. A computer program product of claim 17, wherein the computer-executable program code portions further comprise program code instructions for operating a proxy response from the one or more smart objects to the access commands and alerting the emergency responder of the response from the one or more smart objects.

19. A computer program product of claim 17, wherein the computer-executable program code portions further comprise program code instructions for causing the emergency responder to be contacted in response to receipt of the indication of the emergency condition and causing a list of one or more smart objects that are available to be transmitted.

20. A computer program product of claim 17, wherein the computer-executable program code portions further comprise program code instructions for:
causing an authorization request for the one or more smart objects to be directed to the subject in response to receipt of the request for temporary access; and
in response to a failure to receive a response from the subject to the authorization request, authorizing temporary access following a lapse of at least a predetermined time following direction of the authorization request to the subject.

* * * * *